United States Patent
Bhattacharyya et al.

(10) Patent No.: US 11,573,563 B2
(45) Date of Patent: Feb. 7, 2023

(54) EDGE CENTRIC COMMUNICATION PROTOCOL FOR REMOTELY MANEUVERING A TELE-PRESENCE ROBOT IN A GEOGRAPHICALLY DISTRIBUTED ENVIRONMENT

(71) Applicant: Tata Consultancy Services Limited, Mumbai (IN)

(72) Inventors: Abhijan Bhattacharyya, Kolkata (IN); Ashis Sau, Kolkata (IN); Ruddra Dev Roychoudhury, Kolkata (IN); Hrishav Bakul Barua, Kolkata (IN); Chayan Sarkar, Kolkata (IN); Sayan Paul, Kolkata (IN); Brojeshwar Bhowmick, Kolkata (IN); Arpan Pal, Kolkata (IN); Balamuralidhar Purushothaman, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 336 days.

(21) Appl. No.: 16/988,453

(22) Filed: Aug. 7, 2020

(65) Prior Publication Data
US 2021/0208581 A1   Jul. 8, 2021

(30) Foreign Application Priority Data
Jan. 3, 2020   (IN) ............................. 202021000342

(51) Int. Cl.
G05D 1/00    (2006.01)
G05D 1/02    (2020.01)
H04L 67/141  (2022.01)

(52) U.S. Cl.
CPC ......... *G05D 1/0022* (2013.01); *G05D 1/0212* (2013.01); *H04L 67/141* (2013.01); *G05D 1/0088* (2013.01)

(58) Field of Classification Search
CPC combination set(s) only.
See application file for complete search history.

(56) References Cited

U.S. PATENT DOCUMENTS 7,813,836 B2    10/2010  Wang et al.
2017/0023944 A1 *  1/2017  Wang ..................... B25J 9/1689
(Continued)

FOREIGN PATENT DOCUMENTS

EP    2050544 A1     4/2009
WO    WO 2018/160267 A2  9/2018
WO    WO-2018160267 A2 *  9/2018  .............. B25J 9/161

OTHER PUBLICATIONS

Decision to Grant a European Patent Pursuant to Article 97(1) EPC dated May 12, 2022, for EP Patent Application No. 20 189 855.8; 2 pages.
(Continued)

*Primary Examiner* — Anne Marie Antonucci
*Assistant Examiner* — Jingli Wang
(74) *Attorney, Agent, or Firm* — Finnegan, Henderson, Farabow, Garrett & Dunner LLP

(57) ABSTRACT

Robotic platform for tele-presence applications has gained paramount importance, such as for remote meetings, group discussions, and the like and has sought much attention. There exist some robotic platforms for such tele-presence applications, these lack efficacy in communication and interaction between remote person and avatar robot deployed in another geographic location thus adding network overhead. Embodiments of the present disclosure for edge centric communication protocol for remotely maneuvering tele-presence robot in geographically distributed environment. More specifically, edge-centric tele-presence robot architecture is provided for maneuvering tele-presence robot in distributed geographical environment, wherein the architecture provides a framework that implements both cloud and
(Continued)

edge-centric systems together with a first communication protocol for communication between a master device and an edge device and a second communication protocol different from the first communication protocol for communication between the edge device and the tele-presence robot to improve robustness and efficacy in communication.

18 Claims, 13 Drawing Sheets

(56) References Cited

U.S. PATENT DOCUMENTS

2017/0187966 A1 6/2017 Oetting
2018/0338164 A1 11/2018 Baughman et al.

OTHER PUBLICATIONS

Communication about intention to grant a European Patent received from the European Patent Office in EP Application No. 20 189 855.8, 6 pages, dated Dec. 17, 2022.
Extended European Search Report issued by the European Patent Office in counterpart European Patent Application No. 20 189 855.8, 3 pages, dated Nov. 10, 2020.
Transmission of Certificate for a European patent pursuant to Rule 74 EPC, issued Jun. 22, 2022, for EP Patent Application No. 20 189 855.8; 1 page.
Youdong Chen et al., "An Industrial Robot System Based on Edge Computing: An Early Experience", Computer Science, 2018, Semantic Scholar, https://www.usenix.org/sites/default/files/conference/protected-files/hotedge18_slides_feng.pdf.
H. Hawkeye King et al., "Establishing Multimodal Telepresence Sessions using the Session Initiation Protocol (SIP) and Advanced Haptic Codecs", Haptics Symposium, 2010, IEEE, https://www.researchgate.net/publication/224129870_Establishing_multimodal_telepresence_sessions_using_the_Session_initiation_Protocol_SIP_and_advanced_haptic_codecs/link/0912f51082023563f7000000/download.
Mohamed Faten Zhani et al., "FlexNGIA: A Flexible Internet Architecture for the Next-Generation Tactile Internet", Journal of Network and Systems Management, 2020, Research Gate, https://www.researchgate.net/publication/339986461_FlexNGIA_A_Flexible_Internet_Architecture_for_the_Next-Generation_Tactile_Internet/link/5ec085eb458515626cacd4c0/download.
Pradipta Ghosh et al., "Romano: A Novel Overlay Lightweight Communication Protocol for Unified Control and Sensing of a Network of Robots", Computer Science Robotic, 2017, Arxiv.org, https://www.researchgate.net/publication/320014372_ROMANO_A_Novel_Overlay_Lightweight_Communication_Protocol_for_Unified_Control_and_Sensing_of_a_Network_of_Robots/link/59d3e8c0a6fdc.c181ad949d1/download.

* cited by examiner

EDGE CENTRIC COMMUNICATION PROTOCOL FOR REMOTELY MANEUVERING A TELE-PRESENCE ROBOT IN A GEOGRAPHICALLY DISTRIBUTED ENVIRONMENT

PRIORITY CLAIM

This U.S. patent application claims priority under 35 U.S.C. § 119 to: India Application No. 202021000342, filed on Jan. 3, 2020. The entire contents of the aforementioned application are incorporated herein by reference.

TECHNICAL FIELD

The disclosure herein generally relates to communication protocols for maneuvering tele-presence robots, and, more particularly, to edge centric communication protocol for remotely maneuvering a tele-presence robot in a geographically distributed environment.

BACKGROUND

A tele-presence robotic system for mobile remote presence (MRP) finds applications in many diverse areas such as medicine, education, training, mentoring, monitoring, surveillance, and the like. One of the most important among them is attending meetings and group discussions from remote locations in any agile workplaces. And, for such a tele-presence system to operate systematically without much communication overhead and actuation delay (if the tele-presence system is mobile and is capable of performing some basic activities), it is very important that a proper communication architecture/framework is provided for such a robotic system to save time, money, computational and communication resources and effort.

Considering the fast approaching of an era of unprecedented success in robotics, robots are being deployed in many scenarios nowadays and tele-presence is one of the most prominent applications across varied applications. The most prominent application considers representing a remote person in a meeting, discussion, seminar or conference being his avatar. Such an avatar robot needs a very robust underlying framework to work with efficacy. The current state-of-the-art lacks a robust communication and interactive framework for such an avatar robot. Moreover, the existing systems for such tele-presence robots perform computations over cloud which introduces some communication delays, thus hampering many real-time applications to a great extent.

SUMMARY

Embodiments of the present disclosure present technological improvements as solutions to one or more of the above-mentioned technical problems recognized by the inventors in conventional systems. For example, in one aspect, there is provided a processor implemented method for maneuvering a tele-presence robot in a distributed geographical environment. The method comprises: establishing a session between a master device and a tele-presence robot deployed in distributed geographical environment, wherein the session is established based on a session request transmitted by the master device and the tele-presence robot device to a dedicated session resource deployed on an edge device for the tele-presence robot and the master device, wherein the master device is deployed in the environment on a first communication protocol, and wherein the tele-presence robot comprises an avatar application deployed using a second communication protocol; establishing a communication session between the tele-presence robot and the edge device based on an acknowledgment transmitted by the edge device to the tele-presence robot; obtaining, at a mode resource deployed on the edge device, a selection of at least one operating mode comprising one of a first mode or a second mode from the master device; activating, by the mode resource deployed on the edge device, one or more navigation control resources for the tele-presence robot based on the obtained at least one operating mode; receiving by a command resource deployed on the edge device, a first set of control commands from the master device on the first communication protocol; converting, by the command resource, the first set of control commands to a second set of control commands on the second communication protocol, and pushing each of the second set of control commands into a command queue, wherein the command resource comprises a command-status queue, wherein the command-status queue comprises a completion status of each command and information on a next command to be transmitted; transmitting the second set of control commands to the avatar application of the tele-presence robot on the second communication protocol; and enabling, by using the edge device, the tele-presence robot to execute one or more tasks using the second set of control commands based on the first mode or the second mode, wherein during the execution of the one or more tasks by the tele-presence robot, the tele-presence robot receives one or more inputs from one or more local speakers present in the environment, wherein the edge device translates the one or more inputs into one or more actionable actual commands on the second communication protocol, and wherein the one or more actionable actual commands are indicative of displacement of the tele-presence robot.

In an embodiment, an odometry publisher deployed on the edge device transmits (i) a current position of the avatar application of the tele-presence robot and (ii) relevant position information of the tele-presence robot to a path planner based on the current position of the avatar application. In an embodiment, based on a goal, the path planner deployed on the edge device refrains from re-planning by setting the current position of the tele-presence robot as a starting position of the avatar application and updates position of the tele-presence robot as an end position upon a trajectory completion.

In an embodiment, the command resource changes a current state to a first state based on a control command received and remains in the first state until an acknowledgement is received from the avatar application of the tele-presence robot. In another embodiment, the command resource changes the current state from the first state to a second state upon receiving the acknowledgement from the avatar application of the tele-presence robot. In an embodiment, the current state is reset by the command resource upon notifying the received acknowledgement to the master device.

In an embodiment, the first mode and the second mode are different from each other.

In an embodiment, the first communication protocol and the second communication protocol are different from each other.

In another aspect, there is provided an edge device for maneuvering a tele-presence robot in a distributed geographical environment. The edge device comprises a memory storing instructions; one or more communication interfaces; and one or more hardware processors coupled to the memory via the one or more communication interfaces, wherein the one or more hardware processors are configured by the instructions to: establish a session between a master device and a tele-presence robot deployed in distributed geographical environment, wherein the session is established based on a session request transmitted by the master device and the tele-presence robot device to a dedicated session resource deployed on the edge device for the tele-presence robot and the master device, wherein the master device is deployed in the environment on a first communication protocol, and wherein the tele-presence robot comprises an avatar application deployed using a second communication protocol; establish a communication session between the tele-presence robot and the edge device based on an acknowledgment transmitted by the edge device to the tele-presence robot; obtain, at a mode resource deployed on the edge device, a selection of at least one operating mode comprising one of a first mode or a second mode from the master device; activate, by the mode resource deployed on the edge device, one or more navigation control resources for the tele-presence robot based on the obtained at least one operating mode; receive by a command resource deployed on the edge device, a first set of control commands from the master device on the first communication protocol; convert, by the command resource, the first set of control commands to a second set of control commands on the second communication protocol, and push each of the second set of control commands into a command queue, wherein the command resource comprises a command-status queue, wherein the command-status queue comprises a completion status of each command and information on a next command to be transmitted; transmit the second set of control commands to the avatar application of the tele-presence robot on the second communication protocol; and enable, by using the edge device, the tele-presence robot to execute one or more tasks using the second set of control commands based on the first mode or the second mode, wherein during the execution of the one or more tasks by the tele-presence robot, the tele-presence robot receives one or more inputs from one or more local speakers present in the environment, wherein the edge device translates the one or more inputs into one or more actionable actual commands on the second communication protocol, and wherein the one or more actionable actual commands are indicative of displacement of the tele-presence robot.

In an embodiment, an odometry publisher deployed on the edge device transmits (i) a current position of the avatar application of the tele-presence robot and (ii) relevant position information of the tele-presence robot to a path planner based on the current position of the avatar application. In an embodiment, based on a goal, the path planner deployed on the edge device refrains from re-planning by setting the current position of the tele-presence robot as a starting position of the avatar application and updates position of the tele-presence robot as an end position upon a trajectory completion.

In an embodiment, the command resource changes a current state to a first state based on a control command received and remains in the first state until an acknowledgement is received from the avatar application of the tele-presence robot. In another embodiment, the command resource changes the current state from the first state to a second state upon receiving the acknowledgement from the avatar application of the tele-presence robot. In an embodiment, the current state is reset by the command resource upon notifying the received acknowledgement to the master device.

In an embodiment, the first mode and the second mode are different from each other.

In an embodiment, the first communication protocol and the second communication protocol are different from each other.

In yet another aspect, there are provided one or more non-transitory machine-readable information storage mediums comprising one or more instructions which when executed by one or more hardware processors cause maneuvering a tele-presence robot in a distributed geographical environment by: establishing a session between a master device and a tele-presence robot deployed in distributed geographical environment, wherein the session is established based on a session request transmitted by the master device and the tele-presence robot device to a dedicated session resource deployed on an edge device for the tele-presence robot and the master device, wherein the master device is deployed in the environment on a first communication protocol, and wherein the tele-presence robot comprises an avatar application deployed using a second communication protocol; establishing a communication session between the tele-presence robot and the edge device based on an acknowledgment transmitted by the edge device to the tele-presence robot; obtaining, at a mode resource deployed on the edge device, a selection of at least one operating mode comprising one of a first mode or a second mode from the master device; activating, by the mode resource deployed on the edge device, one or more navigation control resources for the tele-presence robot based on the obtained at least one operating mode; receiving by a command resource deployed on the edge device, a first set of control commands from the master device on the first communication protocol; converting, by the command resource, the first set of control commands to a second set of control commands on the second communication protocol, and pushing each of the second set of control commands into a command queue, wherein the command resource comprises a command-status queue, wherein the command-status queue comprises a completion status of each command and information on a next command to be transmitted; transmitting the second set of control commands to the avatar application of the tele-presence robot on the second communication protocol; and enabling, by using the edge device, the tele-presence robot to execute one or more tasks using the second set of control commands based on the first mode or the second mode, wherein during the execution of the one or more tasks by the tele-presence robot, the tele-presence robot receives one or more inputs from one or more local speakers present in the environment, wherein the edge device translates the one or more inputs into one or more actionable actual commands on the second communication protocol, and wherein the one or more actionable actual commands are indicative of displacement of the tele-presence robot.

In an embodiment, an odometry publisher deployed on the edge device transmits (i) a current position of the avatar application of the tele-presence robot and (ii) relevant position information of the tele-presence robot to a path planner based on the current position of the avatar application. In an embodiment, based on a goal, the path planner deployed on the edge device refrains from re-planning by setting the current position of the tele-presence robot as a starting position of the avatar application and updates position of the tele-presence robot as an end position upon a trajectory completion.

In an embodiment, the command resource changes a current state to a first state based on a control command received and remains in the first state until an acknowledgement is received from the avatar application of the tele-presence robot. In another embodiment, the command resource changes the current state from the first state to a second state upon receiving the acknowledgement from the avatar application of the tele-presence robot. In an embodiment, the current state is reset by the command resource upon notifying the received acknowledgement to the master device.

In an embodiment, the first mode and the second mode are different from each other.

In an embodiment, the first communication protocol and the second communication protocol are different from each other.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
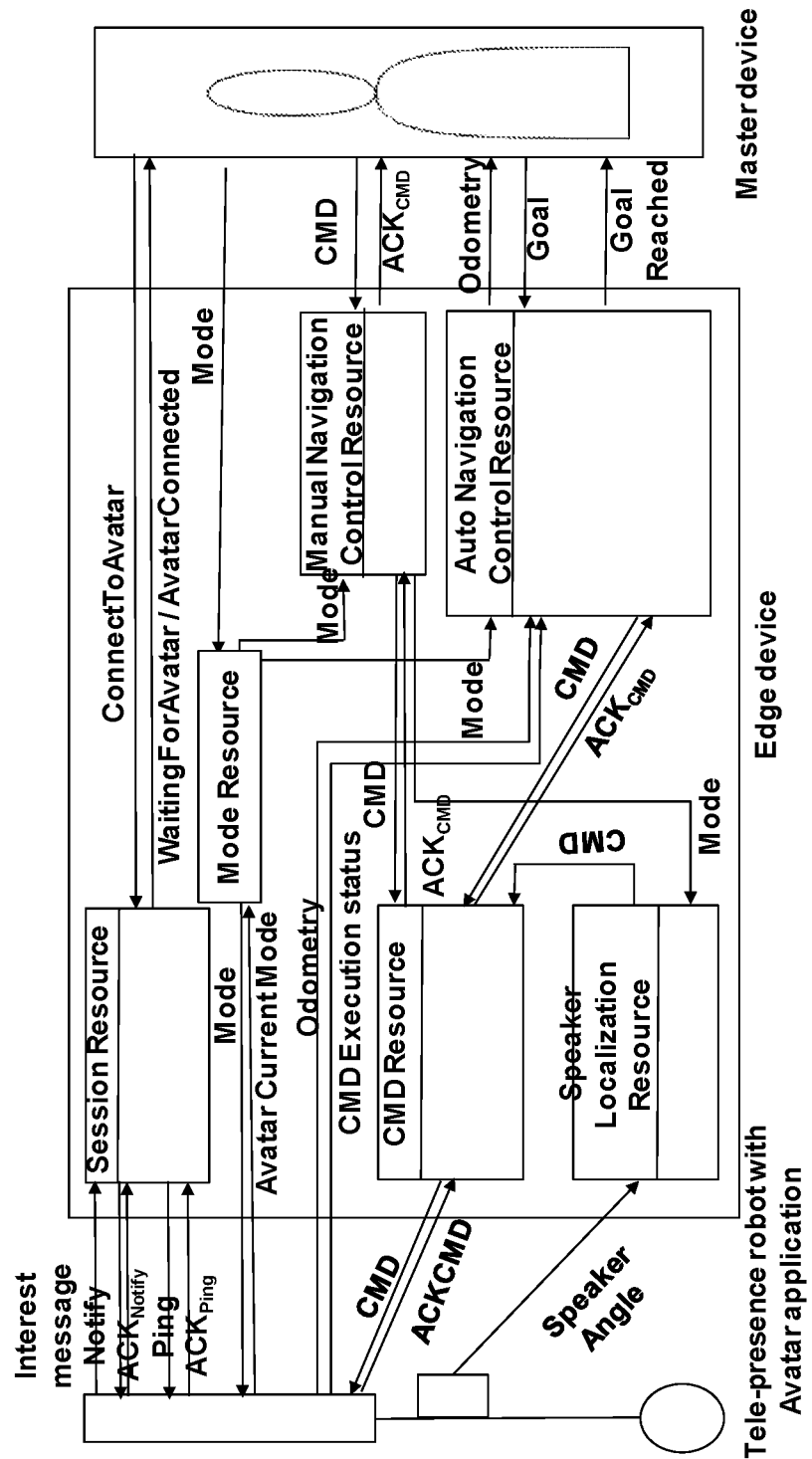
FIG. 1 illustrates an edge-centric tele-presence robot architecture in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Most of existing tele-presence systems are just video-conferencing systems with limited functionality. Moreover, these mobile systems need to be operated by the remote users without much automated features in the tele-presence system itself. And, having said about automatic features, a robust communication framework with minimum network overhead and communication delay is required for the tele-presence system itself for such a system to operate satisfactorily. Embodiments of the present disclosure provide systems and methods that implement an edge-centric with a robust protocol to distribute the responsibilities between the Edge and an avatar of a tele-presence robot for optimizing the resource consumption at the avatar-end. For instance, a tele-presence robot can be used by a person in agile workplace scenario where meetings are very often, and a person needs to be present in all the meeting to understand the flow of activities in his project. Consider a person using such a robot to attend remote meetings if he is personally not present in the meeting due to some reasons. In such a case a robot needs to behave like a real person similarly as he would have behaved had he been in the meeting himself. To facilitate such autonomy, various features are required in the tele-presence robot itself. The person controlling the robot should not be bothered about all the actions of the robot that it should perform in response to the inputs (audio/text/gesture) from the meeting environment (people/co-located attendees and others).

So, firstly, to have such autonomy where the person attending the meeting through the robot needs to have minimum effort in controlling the robot, can be achieved using some of the features provided by present disclosure by way of exemplary embodiments. The edge-centric system as provided by the present disclosure facilitates seamless flow of data and command among all technical modules of the tele-presence system. More specifically, an edge-centric architecture (also referred as 'edge system' or 'edge-centric system' or 'edge' and may be interchangeably used hereinafter) is implemented by the present disclosure for communication between a controlling person and the robot (Double 2 is a robot type used for implementation by the present disclosure and shall not be construed as limiting the scope herein). The edge acts as the intermediate computing device for the functionalities as stated herein. The robot has the functionalities of natural language processing (NLP) for taking commands, turning its orientation to the speaking person based on speaker localization methods, avatar face of the remote person is displayed/rendered in the robot's end based on speech and introduction of navigational capabilities in the robot to explore and understand various locations of the meeting room with ease. So, all these functionalities require a decent amount of compute power which may not be possible in the Double robot itself. In this regard, the present disclosure provides an edge device for all computing related activities. The present disclosure implements a unique protocol to handle complex communication between the edge and the avatar and maintains various states.

Referring now to the drawings, and more particularly to FIGS. 1 through 7, where similar reference characters denote corresponding features consistently throughout the figures, there are shown preferred embodiments and these embodiments are described in the context of the following exemplary system and/or method.

Figure 2:
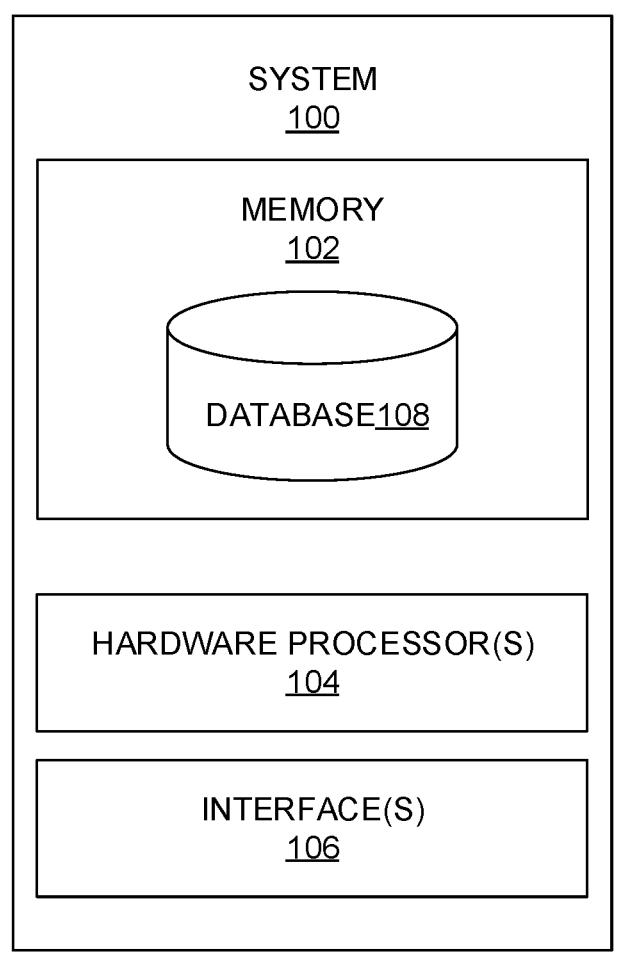
FIG. 2 depicts an exemplary block diagram of a system used in the edge-centric tele-presence robot architecture of FIG. 1, in accordance with an embodiment of the present disclosure.

FIG. 1 illustrates an edge-centric tele-presence robot architecture in accordance with an embodiment of the present disclosure. FIG. 2 depicts an exemplary block diagram of a system used in the edge-centric tele-presence robot architecture of FIG. 1, in accordance with an embodiment of the present disclosure. Each of components such as an edge device, tele-presence robot and a master device as depicted in the edge-centric tele-presence robot architecture of FIG. 1 have components of the system 100 as depicted in FIG. 2. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. More specifically, the edge device, the tele-presence robot and the master device as depicted in the edge-centric tele-presence robot architecture of FIG. 1 have one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises information, for example, control commands that are translated for executing various tasks and information exchange between the master device and the tele-presence robot via the edge device. The tele-presence robot may be referred as a robot having an avatar application that is responsible to execute task(s) based on inputs received which are translated to control commands on a communication protocol. It is to be understood by a person having ordinary skill in the art or person skilled in the art that the expressions 'tele-presence robot' may be referred as the 'robot' may be interchangeably used hereinafter. The edge device may be referred as an edge that receives various control commands from the master device on a communication protocol and translates the commands to suitable instructions set/commands and communicates with the robot on another communication protocol for execution various task(s). It is to be understood by a person having ordinary skill in the art or person skilled in the art that the expressions 'edge device' and 'edge' may be interchangeably used hereinafter. The 'master device' may be referred as 'a master' that transmits control commands to the edge for execution of various tasks by the robot in one or more operating modes. It is to be understood by a person having ordinary skill in the art or person skilled in the art that the expressions 'master device' and 'master' may be interchangeably used hereinafter. Further, the expressions 'avatar application' and 'avatar' refer to an interface in the robot that may include a display for displaying information pertaining to (i) commands received on a communication protocol via the edge and (ii) various task(s) to be performed or task(s) that are being performed for a given command.

Figure 3A:
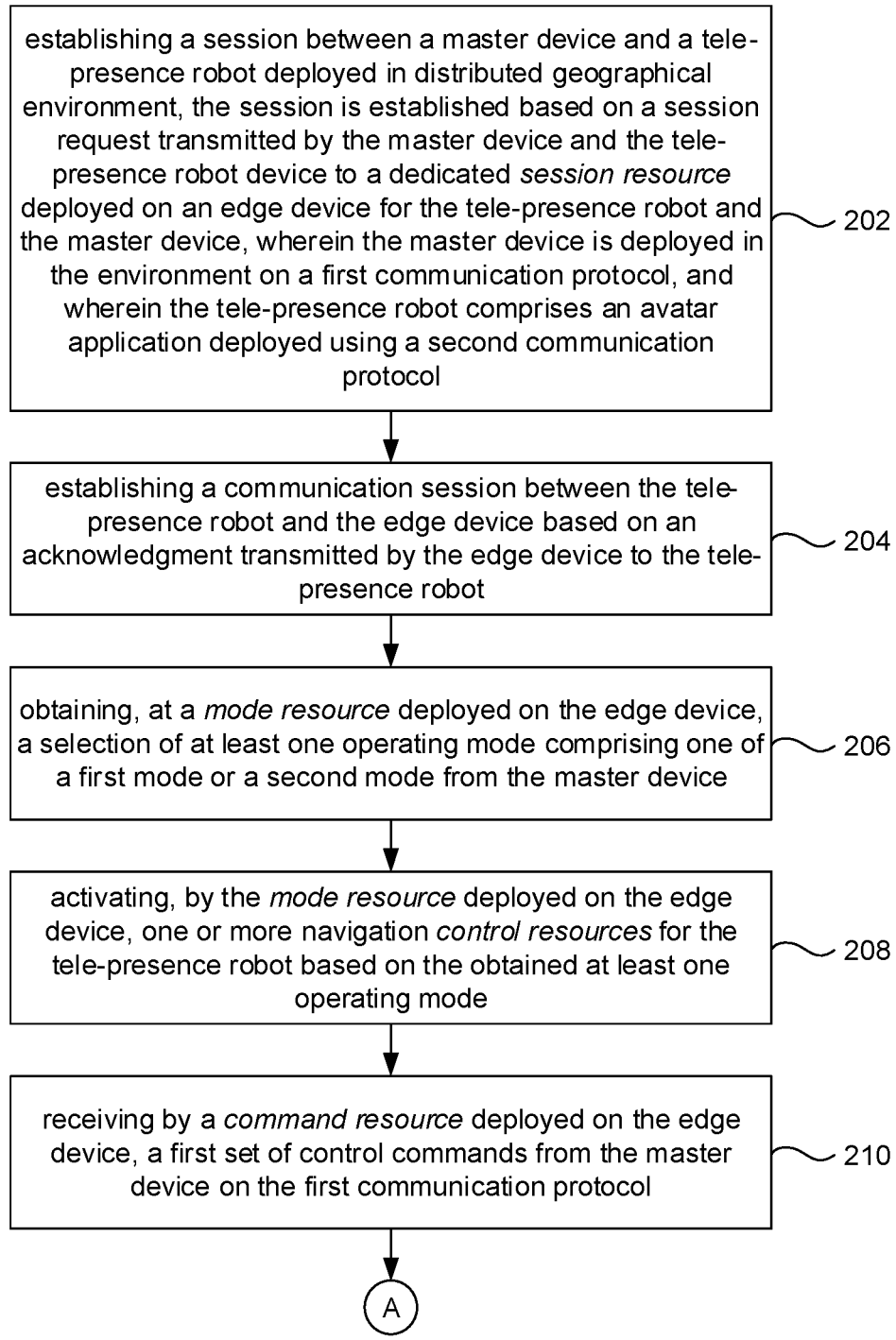
FIGS. 3A-3B depict an exemplary flow chart for remotely maneuvering a tele-presence robot in a geographically distributed environment by implementing edge centric communication protocol and by using the system of FIG. 2, in accordance with an embodiment of the present disclosure.
Figure 3B:
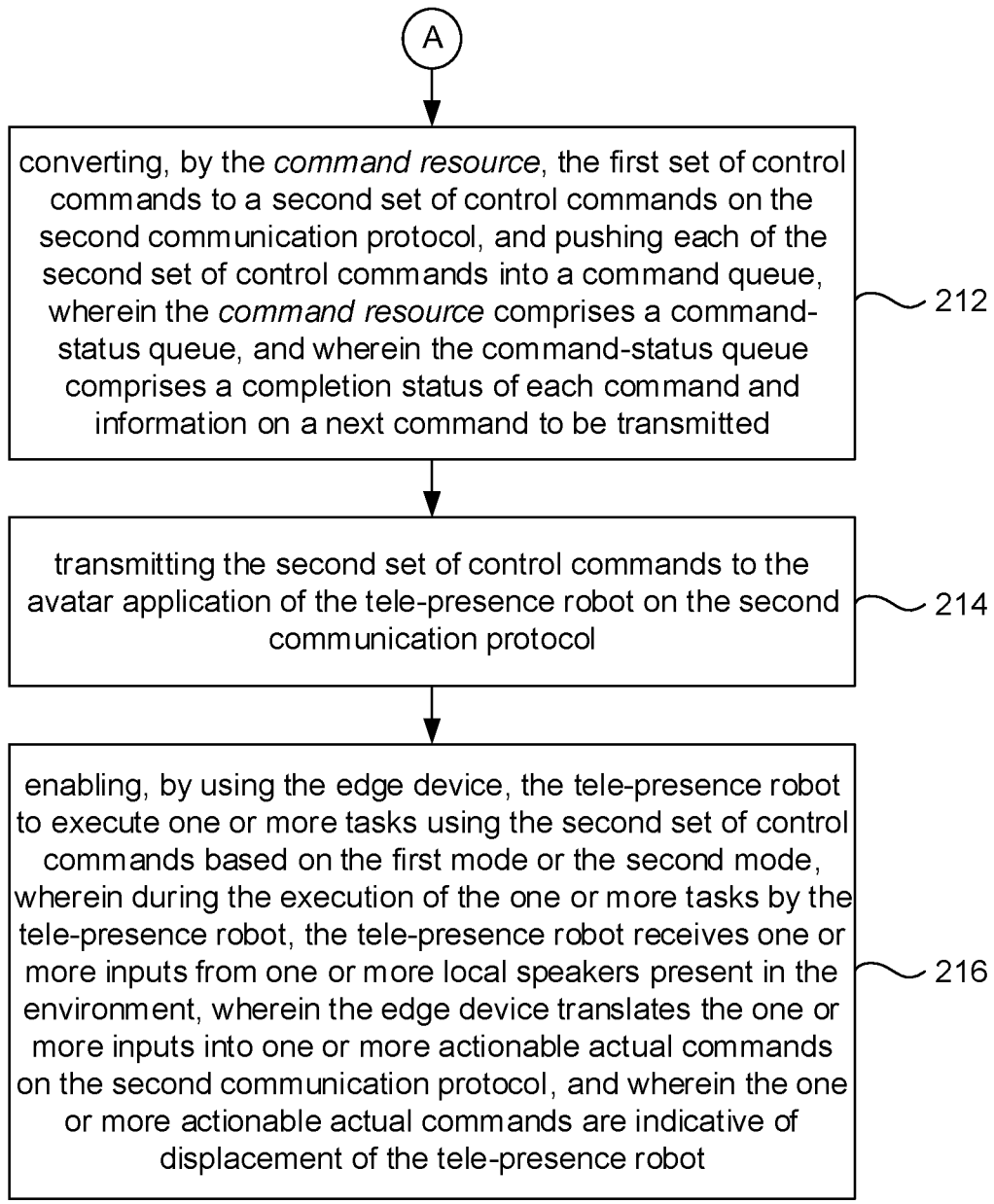
Figure 4A:
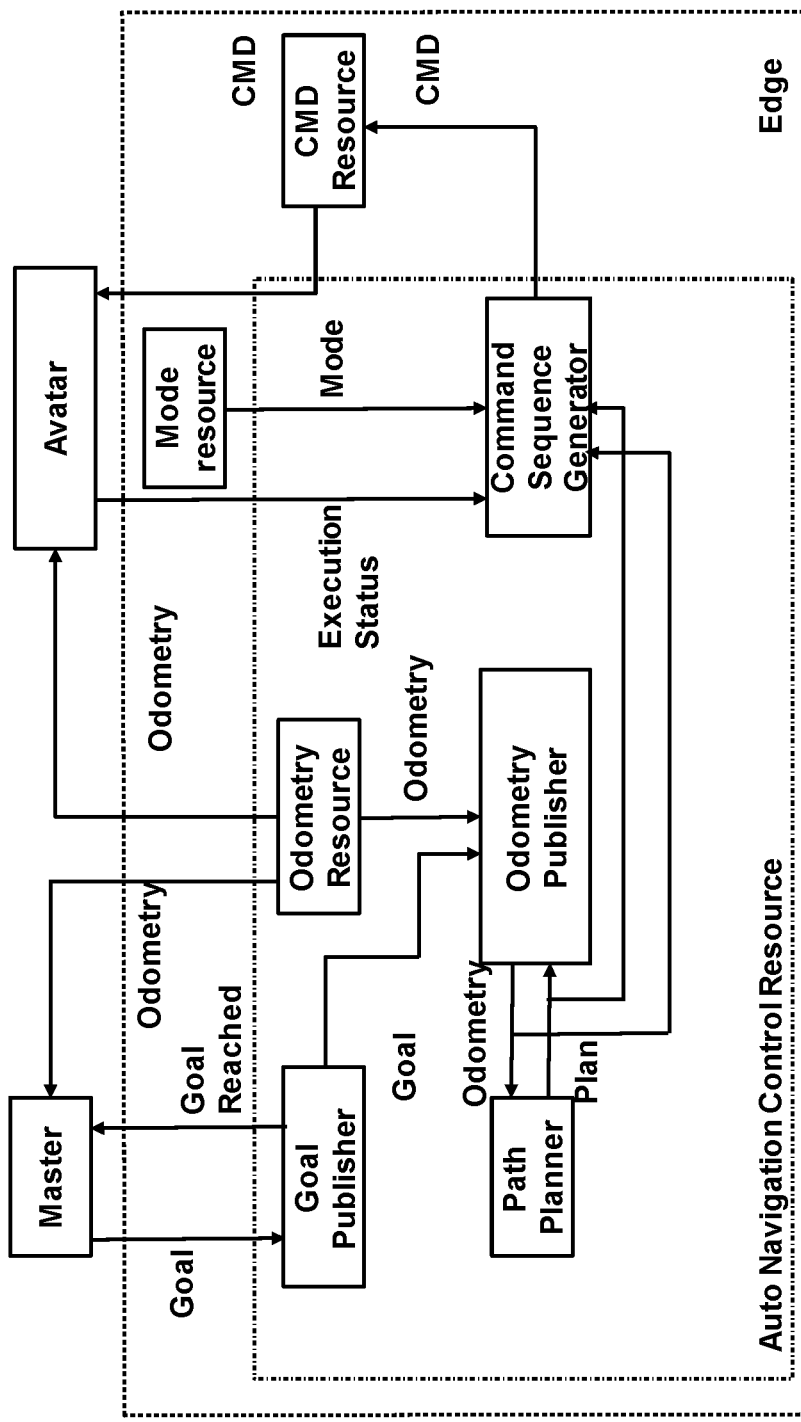
FIG. 4A depicts the edge-centric tele-presence robot architecture in an autonomous mode (or auto mode), in accordance with an embodiment of the present disclosure.
Figure 4B:
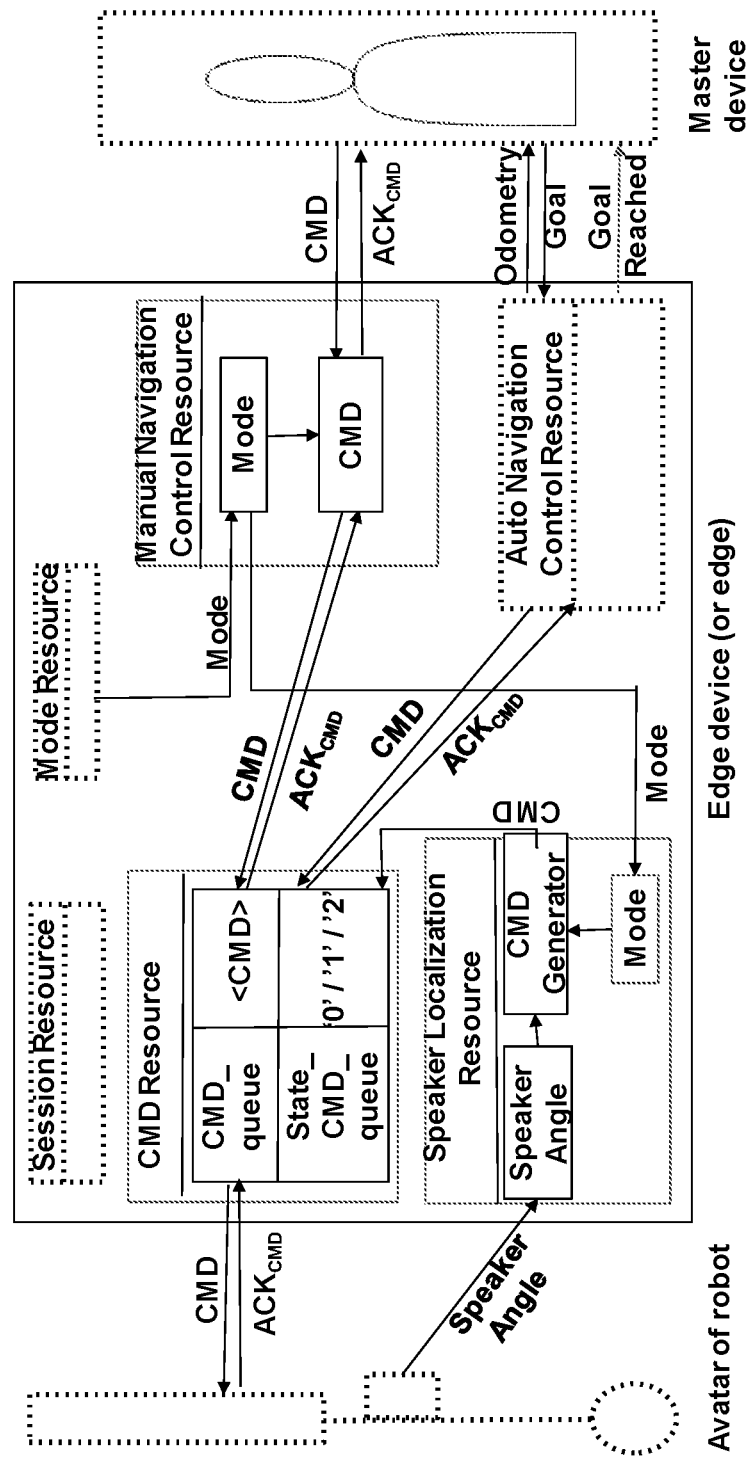
FIG. 4B depicts the edge-centric tele-presence robot architecture of FIG. 1 in a manual mode, in accordance with an embodiment of the present disclosure.
Figure 4C:
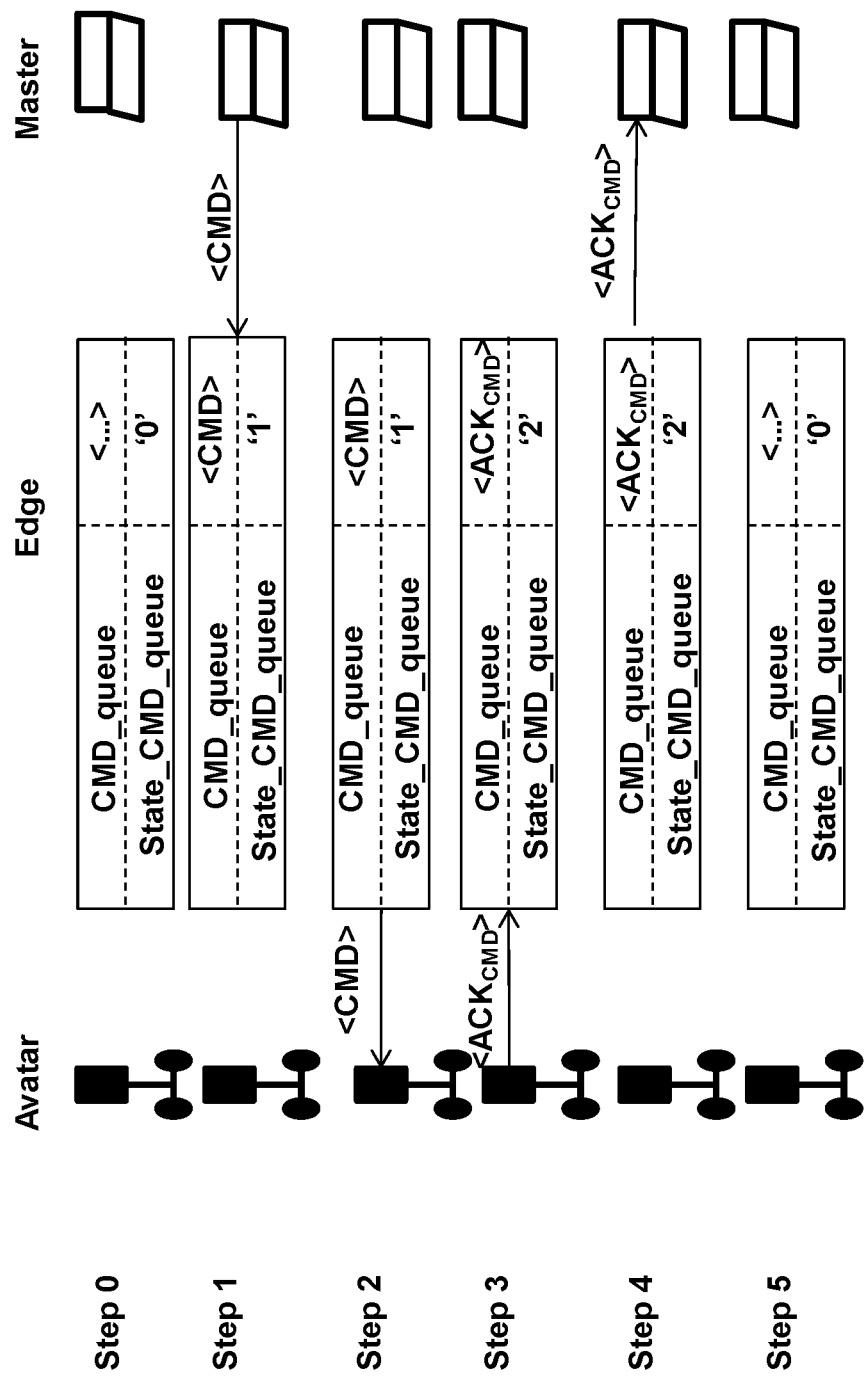
FIG. 4C depicts a portion of the edge-centric tele-presence robot architecture of FIG. 1 in the manual mode selected by a master device, in accordance with an embodiment of the present disclosure.

FIGS. 3A-3B, with reference to FIGS. 1-2, depict an exemplary flow chart for remotely maneuvering the tele-presence robot in a geographically distributed environment by implementing edge centric communication protocol and by using the system 100 of FIG. 2, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the edge-centric tele-presence robot architecture of FIG. 1 and the system 100 of FIG. 2, the flow diagram as depicted in FIG. 3, block diagram of FIGS. 4A-4C depicting various operating modes of the tele-presence robot and timing diagrams of FIGS. 6A through 6D, and a communication protocol message format of FIG. 7. In the present disclosure, distributed geographical environment refers to a remote environment wherein robot is being maneuvered at a first location (e.g., say office or say first city Kolkata) via the edge device by a master device (or a user of the master device) wherein the master device or the user is at a second location (e.g., say home or a second city say Bengaluru). At step 202 of the present disclosure, a session between the master device and the tele-presence robot deployed in distributed geographical environment is established based on a session request transmitted by the master device and the tele-presence robot device to a dedicated session resource deployed on the edge device for both the tele-presence robot and the master device. In an embodiment of the present disclosure, the master device is deployed in the environment on a first communication protocol and the tele-presence robot comprises an avatar application deployed using a second communication protocol. The first communication protocol is built on a reliable transport. The second communication protocol is built on a best-effort transport. The above step 202 is better understood by way of following example. For instance, for establishing and maintaining a session between an avatar application of the robot and the edge device, a perpetual session resource is needed that is started with an interest message, following which the session resource on the edge device sends back a notification message, and the acknowledgement of it from the avatar application establishes the session. Session resource also maintains the session between the edge device and the master device. The above example is depicted left portion of FIG. 1 by way of interest message, Notify, $ACK_{notify}$, ping, $ACK_{ping}$ and the like.

At step 204 of the present disclosure, a communication session is established between the tele-presence robot and the edge device based on an acknowledgment transmitted by the edge device to the tele-presence robot. Periodic pings are sent from edge to avatar and avatar returns the acknowledgement to the pings to notify that the session is active. This is achieved via a session resource deployed on the edge device as depicted in FIG. 1. This is important in cases when master is not communicating with avatar, but the avatar needs to be ready to receive further commands.

At step 206 of the present disclosure, a selection of at least one operating mode is obtained at a mode resource deployed on the edge device. The at least one operating mode is a first mode or a second mode, the second mode is different from the first mode. For instance, the first mode may refer to an autonomous mode and the second mode refers to a manual mode. The mode resource as depicted in FIG. 1, is configured to switch between the manual and autonomous Modes chosen by the master device. Additionally, the mode resource is configured to feed the mode information back to the edge device.

At step 208 of the present disclosure, based on the obtained at least one operating mode, one or more navigation control resources are activated by the mode resource deployed on the edge device for the tele-presence robot. In other words, once the mode selection information is obtained by the edge device from the master device, the mode resource enables activation of auto and/or manual navigation control resource(s).

At step 210 of the present disclosure, a command resource deployed on the edge device receives a first set of control commands from the master device on the first communication protocol. The first set of control commands specify the spatial position of the robot in second mode and in the first mode, it specifies the low level command to be executed, i.e., F, B, L, R., where F=>Forward, B=>Backward, L=>Left turn, R=>Right turn. At step 212 of the present disclosure, the command resource converts the first set of control commands to a second set of control commands on the second communication protocol, wherein each of the second set of control commands are pushed into a command queue. In case of auto-mode (i.e., first mode) the command from the master gets translated by the path planner. For example, if the master puts a goal to avatar to move to some arbitrary coordinate (x2, y2) and if the present/current position of the Avatar is (x1, y1), then the path planner translates the accessible trajectory from (x1,y1) to (x2, y2) into a set of low-level commands for actual physical movement. The exact command sequence depends on the situation. However, it may look like [F, L, F, F, R, and the like]. In the second mode, i.e., manual-mode, the commands from the master are translated transparently. The commands may come from a joystick or simple key-board short cuts or up, down, right, left keys. So, the key-press(es) or joystick movements get directly translated into F, B, L, R depending on the motion of the joystick or which key gets pressed. The command resource comprises a command-status queue that indicates a completion status of each command and information on a next command to be transmitted.

At step 214 of the present disclosure, the edge device transmits the second set of control commands to the avatar application of the tele-presence robot on the second communication protocol. At step 216 of the present disclosure, the edge device enables (or triggers) the tele-presence robot to execute one or more tasks using the second set of control commands based on the first mode or the second mode that is being selected for operation. Few examples of utilization of second mode set of command can be, but are not limited to, say navigating to a particular predefined goal location, returning to the charging dock when low on charge, etc.

During the execution of the one or more tasks by the tele-presence robot, the tele-presence robot receives one or more inputs from one or more local speakers present in the environment. These one or more inputs are transmitted by the robot to the edge device on the second communication protocol, wherein the edge device translates the one or more inputs into one or more actionable actual commands on the second communication protocol. The one or more actionable actual commands are then received by the tele-presence robot for displacement of the tele-presence robot. For instance, an actionable actual command may include locating at least one speaker using angle and rotation vector information comprised in the command. Other actionable actual commands can include performing tasks such as locating extravagant noisy equipment in factories during remote maintenance supervision, locating noise out of sudden collapse of structures during rescue operation monitoring, etc.

The above steps 208 till 216 are better understood by way of various figures and its exemplary description as being discussed below:

FIGS. 4A and 4B, with reference to FIGS. 1 through 3, depict the edge-centric tele-presence robot architecture with various operating modes being selected in accordance with an embodiment of the present disclosure. More specifically, FIG. 4A, with reference to FIGS. 1 through 3, depicts the edge-centric tele-presence robot architecture in an autonomous mode (or auto mode), in accordance with an embodiment of the present disclosure. In the autonomous mode, the master device sends a goal to a goal publisher deployed on the edge device, wherein the goal publisher sends the goal to a path planner. The path planner is deployed on the edge device, wherein upon receiving the goal from the goal publisher, the path planner determines (or gets) an end point which is also sent to an odometry publisher deployed on the edge device. The odometry publisher marks this point as the position of the robot when the robot reaches its goal. Moreover, an odometry resource deployed on the edge device obtains odometry from the avatar application and sends it to the odometry publisher to give the information to the path planner. The odometry resource (or odometry publisher) also transmits the odometry to the master device to display position of the tele-presence robot at an interface of the master device. More specifically, the odometry publisher maintains the current position of the avatar and sends only the positions relevant to the path planner. When a goal is given, it sets the tele-presence robot's position as the starting position of the avatar and at the end, when a trajectory is completed, it updates its position as the end position of the avatar. This is done to prevent re-planning by the path planner.

In other words, the odometry publisher transmits (i) a current position of the avatar application of the tele-presence robot and (ii) relevant position information of the tele-presence robot to the path planner based on the current position of the avatar application and based on a goal the path planner deployed on the edge device refrains from re-planning by setting the current position of the tele-presence robot as a starting position of the avatar application and updates position of the tele-presence robot as an end position upon a trajectory completion. Based on the path planner, a command sequence generator deployed on the edge device generates a sequence of commands to be executed by the tele-presence robot. The execution status notifies when a command is completed, and the next command is sent.

FIG. 4B, with reference to FIGS. 1 through 4A, depicts the edge-centric tele-presence robot architecture in a manual mode, in accordance with an embodiment of the present disclosure. FIG. 4C, with reference to FIGS. 1 through 4A, depicts a portion of the edge-centric tele-presence robot architecture of FIG. 1 in the manual mode selected by a master device, in accordance with an embodiment of the present disclosure. More specifically, in FIG. 4C, the manual navigation control resource checks if the mode is manual mode. If the mode is manual mode, then the manual navigation control resource takes all the control commands directly from the master device and passes them to the command resource. In the command resource, the command and state(s) of the command resource changes as shown in FIG. 4C. Initially the state is set to 0. When a command (or control command and interchangeably used herein) is received from the master device, current state is changed to a first state (e.g., state 1) and this first state is maintained until corresponding acknowledgement is not received back from the avatar application. In other words, the command resource changes a current state to a first state based on a control command received and remains in the first state until an acknowledgement is received from the avatar application of the tele-presence robot. And on receiving the acknowledgement from the avatar application, the state is changed into state 2. In other words, the command resource changes the current state from the first state to a second state upon receiving the acknowledgement from the avatar application of the tele-presence robot. Further, the current state is reset after informing the acknowledgement to the master device. In other words, the current state is reset by the command resource upon notifying the received acknowledgement to the master device.

For execution during or autonomous mode or the manual mode, control commands are transmitted to the avatar application via the command resource. The command resource ensures that the avatar application has received the control commands with the help of appropriate acknowledgements for each control command and keeps sending control command(s) till an acknowledgement is obtained.

Figure 5:
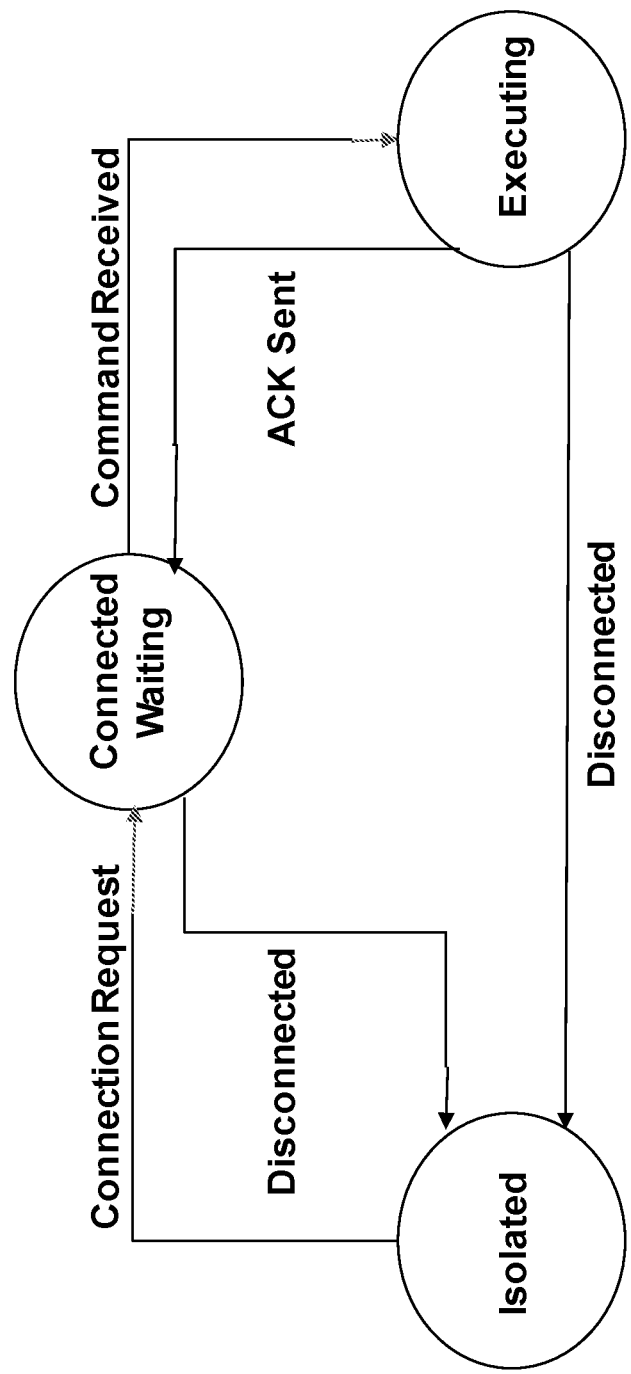
FIG. 5 depicts a state diagram of an avatar application within the tele-presence robot of the edge-centric tele-presence robot architecture of FIG. 1 in accordance with an embodiment of the present disclosure.

FIG. 5, with reference to FIGS. 1 through 4C, depicts a state diagram of an avatar application within the tele-presence robot of the edge-centric tele-presence robot architecture of FIG. 1 in accordance with an embodiment of the present disclosure.

Figure 6A:
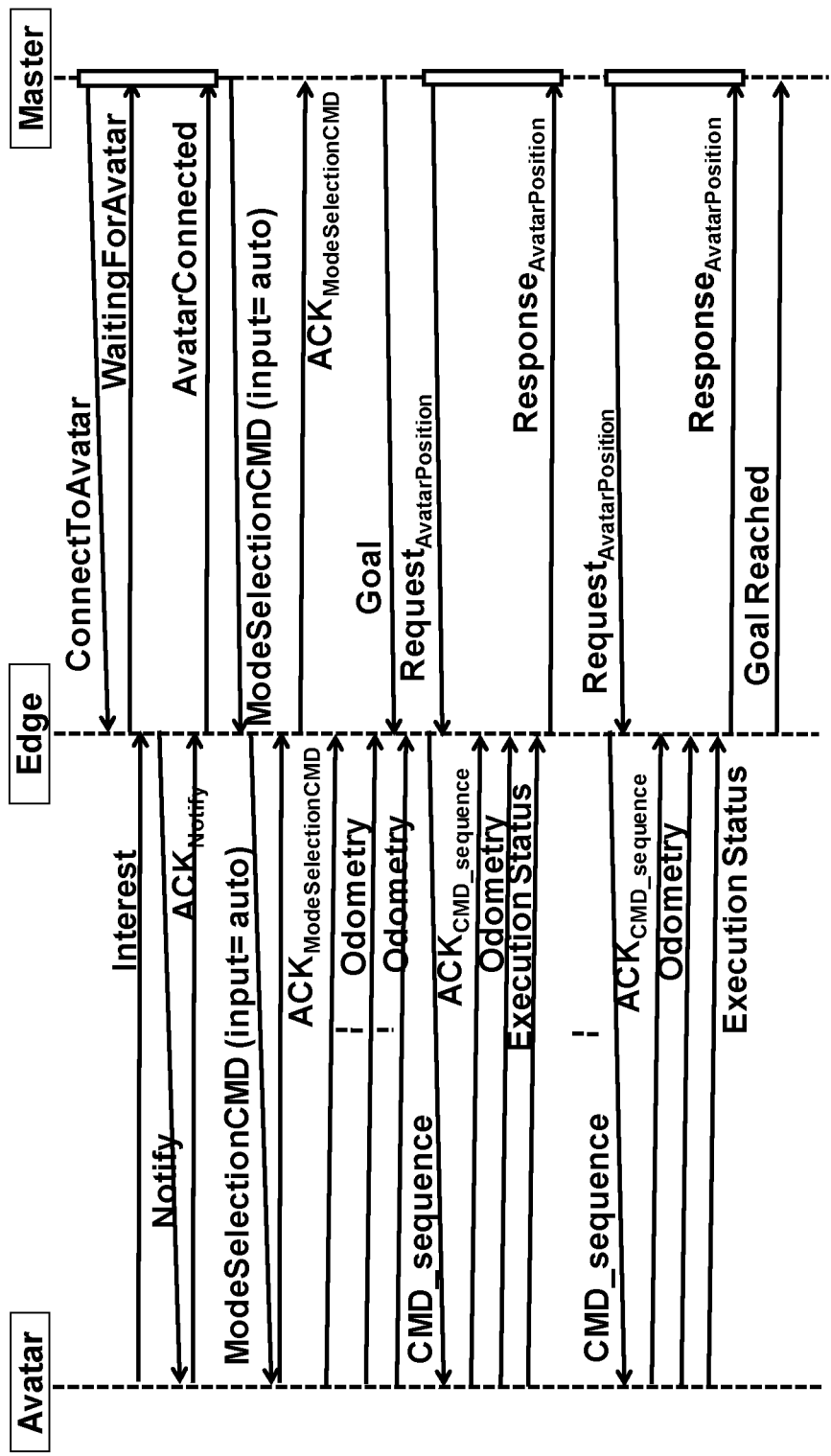
FIG. 6A depicts a timing sequence diagram of a session establishment and goal exchanges in the autonomous mode, in accordance with an embodiment of the present disclosure.

FIG. 6A, with reference to FIGS. 1 through 5, depicts a timing sequence diagram of a session establishment and goal exchanges in the autonomous mode, in accordance with an embodiment of the present disclosure.

Figure 6B:
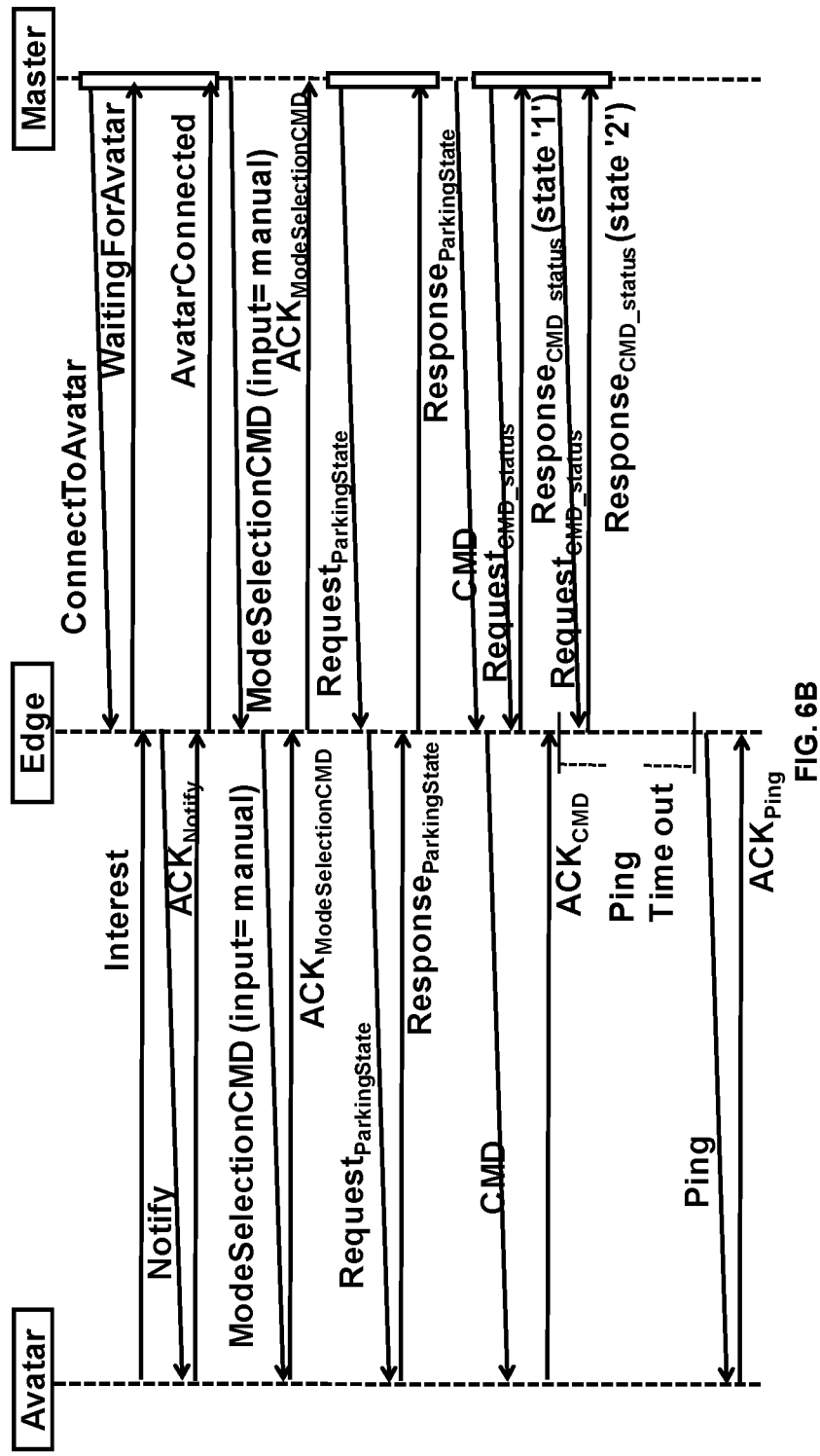
FIG. 6B depicts a timing sequence diagram of a session establishment and control command exchanges in the manual mode, in accordance with an embodiment of the present disclosure.

FIG. 6B, with reference to FIGS. 1 through 6A, depicts a timing sequence diagram of a session establishment and control command exchanges in the manual mode, in accordance with an embodiment of the present disclosure.

Figure 6C:
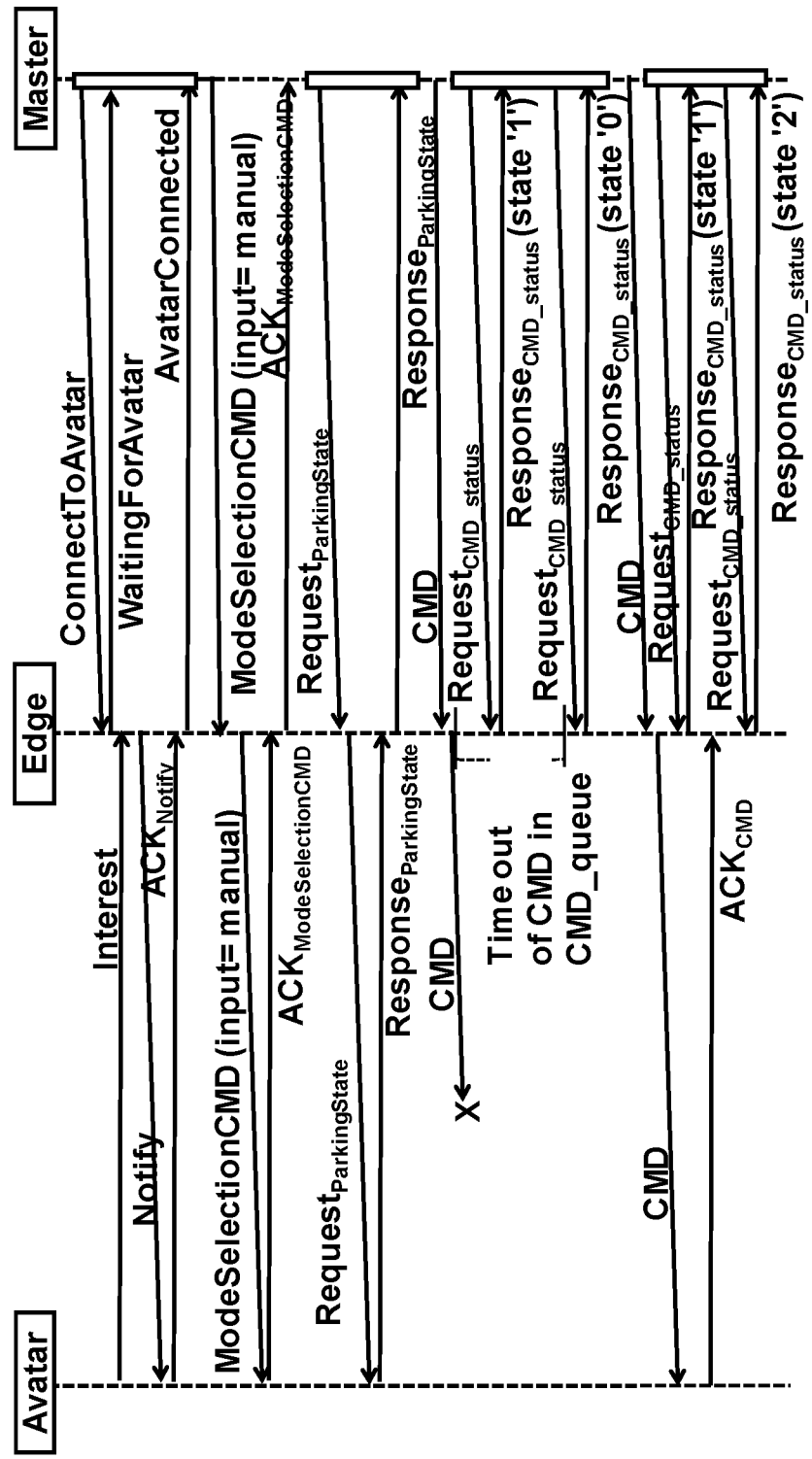
FIG. 6C depicts a timing sequence diagram of a session establishment and control command exchanges in the manual mode when a control command is lost between an edge device and an avatar application due to connectivity issue, in accordance with an embodiment of the present disclosure.

FIG. 6C, with reference to FIGS. 1 through 6B, depicts a timing sequence diagram of a session establishment and control command exchanges in the manual mode when a control command is lost between an edge device and an avatar application due to connectivity issue, in accordance with an embodiment of the present disclosure.

Figure 6D:
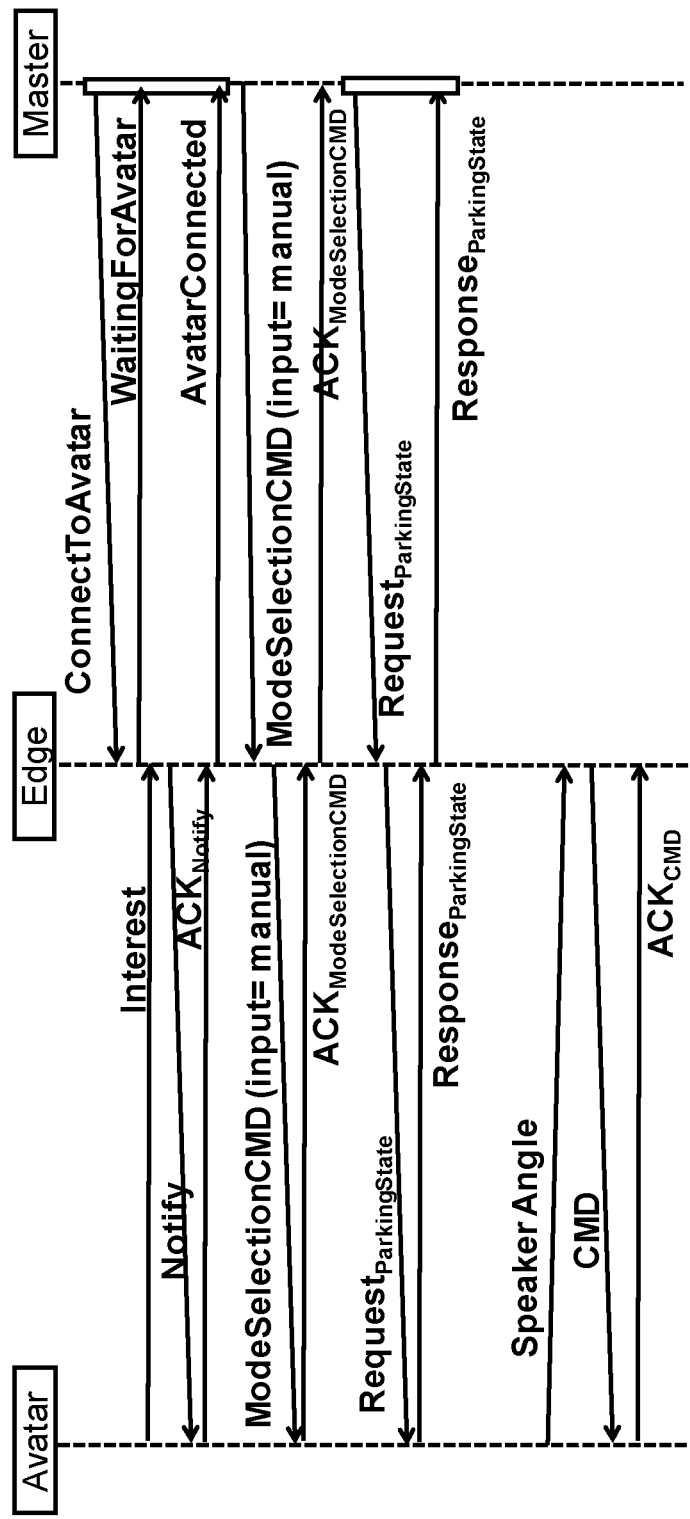
FIG. 6D depicts a timing sequence diagram of a speaker localization in the manual mode, in accordance with an embodiment of the present disclosure.

FIG. 6D, with reference to FIGS. 1 through 6C, depicts a timing sequence diagram of a speaker localization in the manual mode, in accordance with an embodiment of the present disclosure. The session management and the flow of messages in the edge-centric architecture of FIG. 1 are depicted in the sequence diagrams of FIGS. 6A through 6D. The master device sends ConnectToAvatar message to the edge device to start the session. The avatar application also sends its interest message to the edge device which is followed by Notify and ACKNotify message. The edge device then responds to the master device with a Waiting-ForAvatar message if the avatar application is not connected to the edge device. Otherwise, the edge device responds a AvatarConnected message only if it gets back ACKNotify from the avatar application and the session is established.

After session establishment, the master device sends its preferred mode (e.g., the autonomous mode or the manual mode) to the edge device and the edge device delivers the selected operating mode to the avatar application and its acknowledgment to the master device. Then, the master device is informed about the avatar application's (or the tele-presence robot's) parking state (park deployed or retracted) as a response message of the RequestParkingState command. Command (also referred CMD and interchangeably used herein) exchanges are shown in FIG. 6B if the mode is manual and Goal and CMD_sequence exchanges are depicted in FIG. 6A if the selected mode is the autonomous mode. If any command is lost in channel between the edge device and the avatar or the tele-presence robot in some way, then the master device is communicated or informed with state 0 of CMD_status after a time-out where state 2 indicates the successful communication. This scenario is depicted in FIG. 6B. And the local communication between the avatar application and the edge device for speaker localization is depicted in FIG. 6D. Box in these sequence diagrams represents http periodic long polling.

Figure 7:
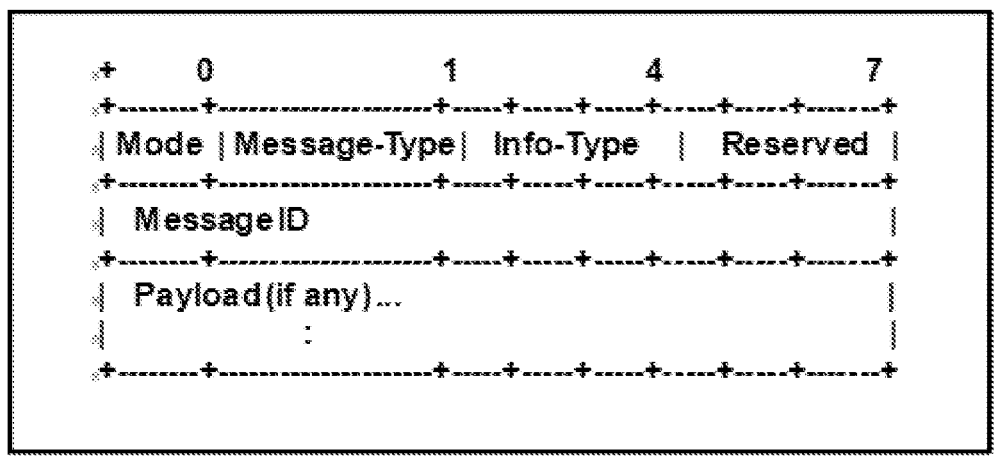
FIG. 7 depicts a communication protocol message format, in accordance with an embodiment of the present disclosure.

FIG. 7, with reference to FIGS. 1 through 6D, depicts a communication protocol message format, in accordance with an embodiment of the present disclosure.

In FIG. 7, message may be interpreted as below:
Mode: 1-bit unsigned integer. It indicates two types of modes—Auto (0) and Manual (1)
Message-Type: 1-bit unsigned integer. It indicates whether it is an information message or an acknowledgement—Information Messages (0) and Acknowledgement (1) Information-Type: 3-bit unsigned integer. Indicate types of information in the message carrying with. Total 6 type of information were defined in this protocol.

Interpretation of these are below by way of non-construing (or non-limiting) examples:
  000: Ping
  001: CMD (command to navigate robot)
  010: Parking State (of the robot)
  011: Odometry (of the robot current position)
  100: Execution Status (of the CMD in robot)
  101: Speaker's Angle (during speaker localization)
Payload: Payload is in JSON format which looks like
{
  {
    "parking_state":
    "CMD":
    "execution_status":
    "x":
    "theta":
  }
}
"parking_state"=>int
"CMD"=>char[ ]
"execution_status"=>boolean
"x", "y", "theta"=>float It is to be understood by a person having ordinary skill in the art or person having skilled in the art that the communication protocol message format as depicted in FIG. 7 and its interpretation as depicted and described above shall not be construed as limiting the scope of the present disclosure.

The system as described in the present disclosure can be part of a mobile edge computing (MEC) environment wherein the Edge is part of the base station in a cellular mobile environment and thereby able to cater efficient robotics solution(s) with a wide area mobility of the robot with reliable and low-latency operations. With MEC being an integral component of fifth generation and beyond mobile communication, the present solution is going to benefit the future generation mobile computing in 5G and beyond.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for maneuvering a tele-presence robot in a distributed geographical environment, the method performed by an edge device, the method comprising:

establishing a session between a master device and a tele-presence robot deployed in distributed geographical environment, wherein the session is established based on a session request transmitted by the master device and the tele-presence robot to a dedicated session resource deployed on the edge device for the tele-presence robot and the master device, wherein the master device is deployed in the environment on a first communication protocol, and wherein the tele-presence robot comprises an avatar application deployed using a second communication protocol;

establishing a communication session between the tele-presence robot and the edge device based on an acknowledgment transmitted by the edge device to the tele-presence robot;

obtaining, at a mode resource deployed on the edge device, a selection of at least one operating mode comprising one of a first mode or a second mode from the master device;

activating, by the mode resource deployed on the edge device, one or more navigation control resources for the tele-presence robot based on the obtained at least one operating mode;

receiving, by a command resource deployed on the edge device, a first set of control commands from the master device on the first communication protocol, wherein the command resource changes a current state to a first state based on a control command received and the first state is maintained until an acknowledgement is received from the avatar application of the tele-presence robot;

converting, by the command resource, the first set of control commands to a second set of control commands on the second communication protocol, and pushing each of the second set of control commands into a command queue, wherein the command resource comprises a command-status queue, and wherein the command-status queue comprises a completion status of each command and information on a next command to be transmitted;

transmitting the second set of control commands to the avatar application of the tele-presence robot on the second communication protocol; and enabling, by using the edge device, the tele-presence robot to execute one or more tasks using the second set of control commands based on the first mode or the second mode, wherein during the execution of the one or more tasks by the tele-presence robot, the tele-presence robot receives one or more inputs from one or more local speakers present in the environment, wherein the edge device translates the one or more inputs into one or more actionable actual commands on the second communication protocol, and wherein the one or more actionable actual commands are indicative of displacement of the tele-presence robot.

2. The processor implemented method as claimed in claim 1, wherein the first communication protocol and the second communication protocol are different from each other.

3. The processor implemented method as claimed in claim 1, wherein the first mode and the second mode are different from each other.

4. The processor implemented method as claimed in claim 1, wherein an odometry publisher deployed on the edge device transmits (i) a current position of the avatar application of the tele-presence robot and (ii) relevant position information of the tele-presence robot to a path planner based on the current position of the avatar application, wherein based on a goal, the path planner deployed on the edge device refrains from re-planning by the current setting position of the tele-presence robot as a starting position of the avatar application and updates position of the tele-presence robot as an end position upon a trajectory completion.

5. The processor implemented method as claimed in claim 1, wherein the command resource changes the current state from the first state to a second state upon receiving the acknowledgement from the avatar application of the tele-presence robot.

6. The processor implemented method as claimed in claim 5, wherein the current state is reset by the command resource upon notifying the received acknowledgement to the master device.

7. An edge device for maneuvering a tele-presence robot in a distributed geographical environment, comprising:
a memory storing instructions;
one or more communication interfaces; and
one or more hardware processors coupled to the memory via the one or more communication interfaces, wherein the one or more hardware processors are configured by the instructions to:
establish a session between a master device and a tele-presence robot deployed in distributed geographical environment, wherein the session is established based on a session request transmitted by the master device and the tele-presence robot to a dedicated session resource deployed on the edge device for the tele-presence robot and the master device, wherein the master device is deployed in the environment on a first communication protocol, and wherein the tele-presence robot comprises an avatar application deployed using a second communication protocol;

establish a communication session between the tele-presence robot and the edge device based on an acknowledgment transmitted by the edge device to the tele-presence robot;

obtain, at a mode resource deployed on the edge device, a selection of at least one operating mode comprising one of a first mode or a second mode from the master device;

activate, by the mode resource deployed on the edge device, one or more navigation control resources for the tele-presence robot based on the obtained at least one operating mode;

receive by a command resource deployed on the edge device, a first set of control commands from the master device on the first communication protocol, wherein the command resource changes a current state to a first state based on a control command received and the first state is maintained until an acknowledgement is received from the avatar application of the tele-presence robot;

convert, by the command resource, the first set of control commands to a second set of control commands on the second communication protocol, and pushing each of the second set of control commands into a command queue, wherein the command resource comprises a command-status queue, and wherein the command-status queue comprises a completion status of each command and information on a next command to be transmitted;

transmit the second set of control commands to the avatar application of the tele-presence robot on the second communication protocol; and enable, by using the edge device, the tele-presence robot to execute one or more tasks using the second set of control commands based on the first mode or the second mode, wherein during the execution of the one or more tasks by the tele-presence robot, the tele-presence robot is configured to receive one or more inputs from one or more local speakers present in the environment, wherein the edge device is configured to translate the one or more inputs into one or more actionable actual commands on the second communication protocol, and wherein the one or more actionable actual commands are indicative of displacement of the tele-presence robot.

8. The edge device as claimed in claim 7, wherein the first communication protocol and the second communication protocol are different from each other.

9. The edge device as claimed in claim 7, wherein the first mode and the second mode are different from each other.

10. The edge device as claimed in claim 7, wherein an odometry publisher deployed on the edge device transmits (i) a current position of the avatar application of the tele-presence robot and (ii) relevant position information of the tele-presence robot to a path planner based on the current position of the avatar application, wherein based on a goal, the path planner deployed on the edge device refrains from re-planning by setting the current position of the tele-presence robot as a starting position of the avatar application and updates position of the tele-presence robot as an end position upon a trajectory completion.

11. The edge device as claimed in claim 7, wherein the command resource changes the current state from the first state to a second state upon receiving the acknowledgement from the avatar application of the tele-presence robot.

12. The edge device as claimed in claim 11, wherein the current state is reset by the command resource upon notifying the received acknowledgement to the master device.

13. One or more non-transitory machine-readable information storage mediums comprising one or more instructions which when executed by one or more hardware processors of an edge device cause maneuvering a tele-presence robot in a distributed geographical environment by:
  establishing a session between a master device and a tele-presence robot deployed in distributed geographical environment, wherein the session is established based on a session request transmitted by the master device and the tele-presence robot to a dedicated session resource deployed on the edge device for the tele-presence robot and the master device, wherein the master device is deployed in the environment on a first communication protocol, and wherein the tele-presence robot comprises an avatar application deployed using a second communication protocol;
  establishing a communication session between the tele-presence robot and the edge device based on an acknowledgment transmitted by the edge device to the tele-presence robot;
  obtaining, at a mode resource deployed on the edge device, a selection of at least one operating mode comprising one of a first mode or a second mode from the master device;
  activating, by the mode resource deployed on the edge device, one or more navigation control resources for the tele-presence robot based on the obtained at least one operating mode;
  receiving by a command resource deployed on the edge device, a first set of control commands from the master device on the first communication protocol, wherein the command resource changes a current state to a first state based on a control command received and the first state is maintained until an acknowledgement is received from the avatar application of the tele-presence robot;
  converting, by the command resource, the first set of control commands to a second set of control commands on the second communication protocol, and pushing each of the second set of control commands into a command queue, wherein the command resource comprises a command-status queue, and wherein the command-status queue comprises a completion status of each command and information on a next command to be transmitted;
  transmitting the second set of control commands to the avatar application of the tele-presence robot on the second communication protocol; and
  enabling, by using the edge device, the tele-presence robot to execute one or more tasks using the second set of control commands based on the first mode or the second mode, wherein during the execution of the one or more tasks by the tele-presence robot, the tele-presence robot receives one or more inputs from one or more local speakers present in the environment, wherein the edge device translates the one or more inputs into one or more actionable actual commands on the second communication protocol, and wherein the one or more actionable actual commands are indicative of displacement of the tele-presence robot.

14. The one or more non-transitory machine-readable information storage mediums of claim 13, wherein the first communication protocol and the second communication protocol are different from each other.

15. The one or more non-transitory machine-readable information storage mediums of claim 13, wherein the first mode and the second mode are different from each other.

16. The one or more non-transitory machine-readable information storage mediums of claim 13, wherein an odometry publisher deployed on the edge device transmits (i) a current position of the avatar application of the tele-presence robot and (ii) relevant position information of the tele-presence robot to a path planner based on the current position of the avatar application, wherein based on a goal, the path planner deployed on the edge device refrains from re-planning by the current setting position of the tele-presence robot as a starting position of the avatar application and updates position of the tele-presence robot as an end position upon a trajectory completion.

17. The one or more non-transitory machine-readable information storage mediums of claim 13, wherein the command resource changes the current state from the first state to a second state upon receiving the acknowledgement from the avatar application of the tele-presence robot.

18. The one or more non-transitory machine-readable information storage mediums of claim 17, wherein the current state is reset by the command resource upon notifying the received acknowledgement to the master device.

\* \* \* \* \*